United States Patent [19]

Laing et al.

[11] Patent Number: 5,421,712

[45] Date of Patent: Jun. 6, 1995

[54] SCREW ROTATING AND ADVANCING DEVICE FOR AN INJECTION MOLDING MACHINE

[75] Inventors: Muh-Wang Laing, Miaoli; Mu-An Yan, Kaohsiung; Lang-Fu Tsai, Hsinchu, all of Taiwan, Prov. of China

[73] Assignee: Industrial Technology Research Institute, Taiwan, Prov. of China

[21] Appl. No.: 132,112

[22] Filed: Oct. 5, 1993

[51] Int. Cl.[6] .............................................. B29C 45/77
[52] U.S. Cl. .................................. 425/145; 264/40.7; 366/78; 425/149
[58] Field of Search ............... 425/145, 149; 264/40.3, 264/40.7; 366/78

[56] References Cited

U.S. PATENT DOCUMENTS

| | | | |
|---|---|---|---|
| 4,693,676 | 9/1987 | Inaba | 425/145 |
| 4,718,840 | 1/1988 | Inaba et al. | 425/149 |
| 4,828,473 | 5/1989 | Otake et al. | 425/145 |
| 4,988,273 | 1/1991 | Faig et al. | 425/149 |
| 5,129,808 | 7/1992 | Watanabe et al. | 425/145 |
| 5,206,034 | 4/1993 | Yamazaki | 425/145 |

*Primary Examiner*—Tim Heitbrink
*Attorney, Agent, or Firm*—Scully, Scott, Murphy & Presser

[57] ABSTRACT

A screw rotating and advancing device for an injection molding machine, in which a movable pressure plate is provided with a servomotor to drive a ball screw in association with a ball nut provided at a rear fixing plate, so that the movable pressure plate homogeneously drives a screw shaft passing through a front fixing plate to perform the operations of injection, holding pressure, and measuring back-pressure; and accomplish a close-loop control of the pressure of molding material by using a force sensor. The other side of the movable pressure plate is provided with a servomotor to rotate the screw shaft, so that the rotational speed of the screw shaft can be precisely controlled. Furthermore, the present invention includes a pre-load system including at least two pre-loaded hydraulic cylinders, at least tow pistons and a communicating tube to balance the pressure difference between the prepressurized hydraulic cylinders. Whereby the length of the device can be reduced to save the room occupied by the injection molding machine, and the wearing-out caused by the using of conventional spline shaft and spline groove can be avoided. The present invention also provides evenly force to drive the movable pressure plate and a close-loop control for injection pressure of the molten material, to facilitate precisely injection molding processing.

10 Claims, 8 Drawing Sheets

SCREW ROTATING AND ADVANCING DEVICE FOR AN INJECTION MOLDING MACHINE

BACKGROUND OF THE INVENTION

The present invention relates to a screw-rotating/injection device of an injection molding machine, particularly to a screw-rotating/injection device comprising two electric injection servomotors arranged on a movable pressure plate to rotate a ball screw and a screw shaft such that the length of the device can be reduced, and further comprising a force sensor to detect the pressure of molten material so that a close-loop control for the holding pressure or back pressure of the screw shaft can be accomplished in a injection molding machine to facilitate precise injection of molding processing.

As shown in FIGS. 1a through 1d, a conventional injection molding process generally comprises the steps such as closing and locking a mold, injecting molding material into the mold and holding molding pressure within the mold, cooling and measuring the molding material, and opening the mold and ejecting the molded product. Plastic molding material stored in a hopper (A) can be fed into a heating cylinder (B) by gravity. When a screw shaft (C) is rotated by a hydraulic motor (H), the molding material can be mixed and transferred to the front end of the heating cylinder (B) along a screw groove within the heating cylinder. At the same time, the molding material passing through the heating cylinder (B) is molten by a heating source around the circumference of the heating cylinder (B) and the shearing effect caused by the rotation of the screw shaft (C). When the molten molding material is transferred to the front end of the heating cylinder (B), a counter-pressure will be generated to force the screw shaft (C) back to a predetermined position (a measuring point), and then stops the rotation of the screw shaft (C). Then, the injecting device of a hydraulic cylinder (D) (i.e., an injection cylinder) drives the screw shaft (C) to move forwardly, such that the screw shaft be served as an injection plunger to inject the molten molding material at the front end of the heating cylinder (B) through a nozzle (E) to a closed and locked mold (F) with high pressure and high speed. When a molded product (G) made from the molding plastic material is cooled at a predetermined holding pressure, it can then be ejected from the mold when the mold (F) is opened. Then, the mold can be re-closed to perform the next cycle of molding operation. As mentioned hereinabove, it can be seen that the screw shaft (C) should have the capability for rotational motion and reciprocatively rectilinear motion which are respectively driven by the hydraulic motor (H) and the injection hydraulic cylinder (D). However, such a hydraulic driving system is not only difficult to install and maintain but also energy consuming. In addition, the position control characteristic thereof is poor and the hydraulic pump thereof will generate noise, vibration and oil vapor to deteriorate the working environment.

Figure 1A:
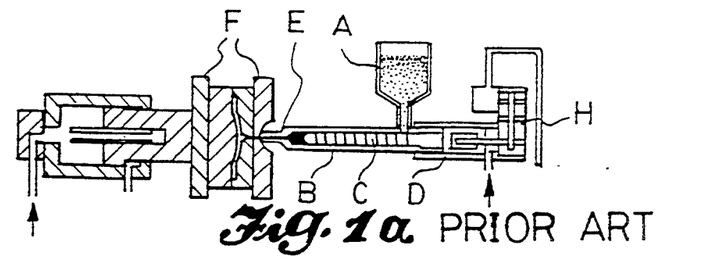
FIGS. 1a through 1d are the schematic drawing showing the operational steps of conventional injection molding machine.
Figure 1B:
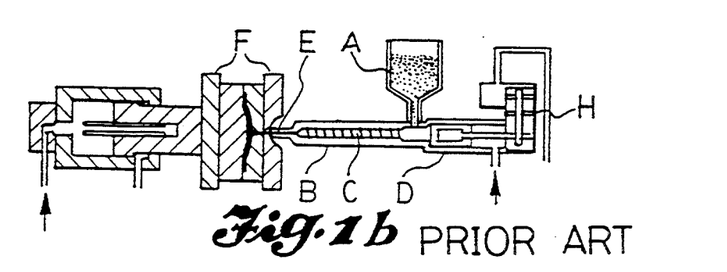
Figure 1C:
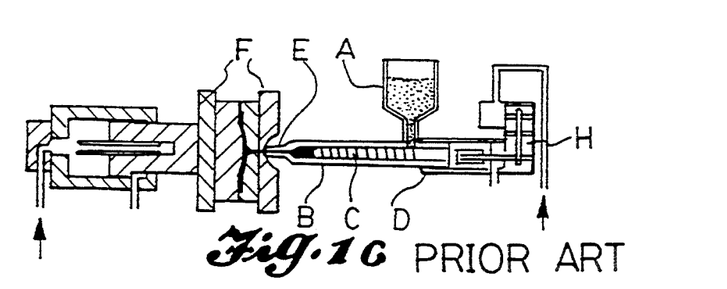
Figure 1D:
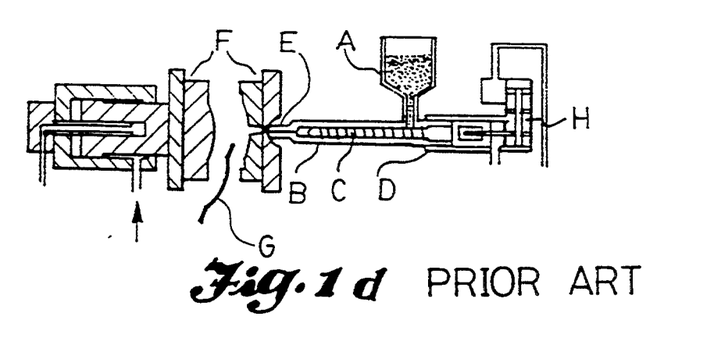
Figure 2:
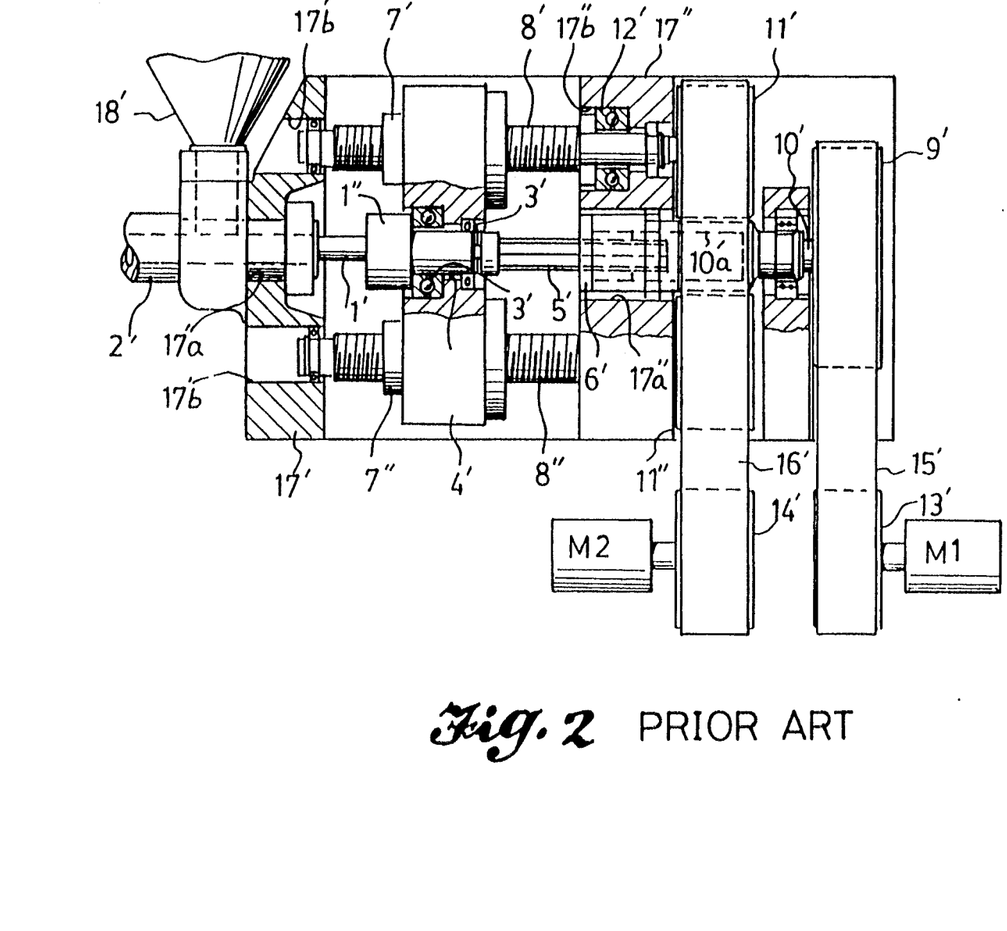
FIG. 2 is a partial sectional side view showing the "screw-rotating/ejection mechanism of injection molding machine" disclosed in U.S. Pat. No. 4,693,676.

In view of this, U.S. Pat. No. 4,693,676, the disclosure of which is incorporated by reference herein, and entitled to Fanuc Ltd., Minamitsuru Japan, disclosed a screw-rotating/injection mechanism of injection molding machine which utilizes servomotors to rotate the screw shaft and to drive the injection operation. As shown in FIG. 2, such a screw-rotating/injection mechanism comprises a servomotor (M1) for driving a driving wheel (13'). The screw shaft (1') thereof can have a measuring rotation by the driving of the driving wheel (13') through the rotation transmission of a timing belt (15'), driven wheels (9'), a shaft (10'), an outer spline shaft (5') and a connecting shaft (1"). A servomotor (M2) rotates a driving wheel (14'), through the torque transmission of a timing belt (16') and driven wheels (11', 11"), so as to rotate the ball screws (8', 8") and drive the ball nuts (7', 7") and pressure plate (4') to move in order to accomplish the processing of injection, holding pressure and backing pressure. Though the using of such a servomotor can avoid some defects of conventional hydraulic injection devices, there are still some defects remained to be improved. For example, when the spline shaft (5') slides in the spline groove (10'a) to perform a measuring rotation of the screw shaft, the torque transmitted between the spline shaft (5') and groove (10'a) is very large and the frictional wearing between the spline shaft (5') and the spline groove (10'a) is unavoidable and thus will deteriorate the precision of operation and decrease the duration of the device. Besides, the sliding arrangement of the spline shaft and the spline groove takes much room rendering the molding machine is lengthened and bulky. When a plurality of ball screws (8', 8") are driven by an injection servomotor (M2), the pressure plate (4') tends to be oblique since ball screws are exerted unequal force or do not move in synchronism due to the different lead error between the ball screws and the backlash between the belt and wheel. As a result, the screw shaft (1') and the heating cylinder (2') tend to be worn out, and influence the quality of the molded products and the stability thereof. In addition, the steel balls of the ball screws are easier to be broken. Further, such a device does not include any feedback sensor, it therefore cannot complete a close-loop control for holding pressure and back pressure, and thus disadvantage the precise injection molding processing.

SUMMARY OF THE INVENTION

The primary object of the present invention is to provide a screw-rotating/injection device of an injection machine in which a servomotor (3) is fixedly mounted on a movable pressure plate (23) to rotate a ball screw (34) in association with a ball nut (35) fixedly mounted on a rear fixing plate (24) so that the ball screw (34) is driven to move axially by the servomotor so as to force the movable pressure plate (23) to slide along two sliding rods (22, 22'), and so as to accomplish the control for injection holding pressure and measuring back pressure; thereby the use of a spline shaft and a spline groove can be avoided, and the length of the injection device can be reduced due to the ball nut (35) being fixedly mounted on the rear fixing plate (24), and the frictional wearing between a spline shaft and a spline groove is avoided.

The further object of the present invention is to provide one servomotor and one ball screw to avoid unbalanced force between ball screws which causes pressure plate to be oblique and when at least two ball nuts are provided on a movable pressure plate to be in association with at least two ball screws respectively driven by one servomotor, in which each ball nut is provided with one pre-pressurized hydraulic system having two pistons, two hydraulic cylinders and a fluid communicating tube between the cylinders, so that the pressure difference between the cylinders is balanced by the fluid communication of the communicating tube and so that obliquity of the movable pressure plate caused by the ball screws failing to synchronously rotate is remedied.

The still further object of the present invention is to provide a particular construction and arrangement such that a force sensor (39) can be provided within the movable pressure plate to detect pressure of the molten molding material, so as to effectively feedback the message of the pressure error of the molten material and so as to accomplish a close-loop control for the pressure to facilitate the production of precise parts or components.

These and other objects, advantages and features of the present invention will be more fully understood and appreciated by reference to the written specification.

BRIEF DESCRIPTION OF THE DRAWINGS

FIG. 6 is a partially enlarged view of the transmission construction of the embodiment of the present invention;

DETAILED DESCRIPTION OF THE INVENTION

Figure 3:
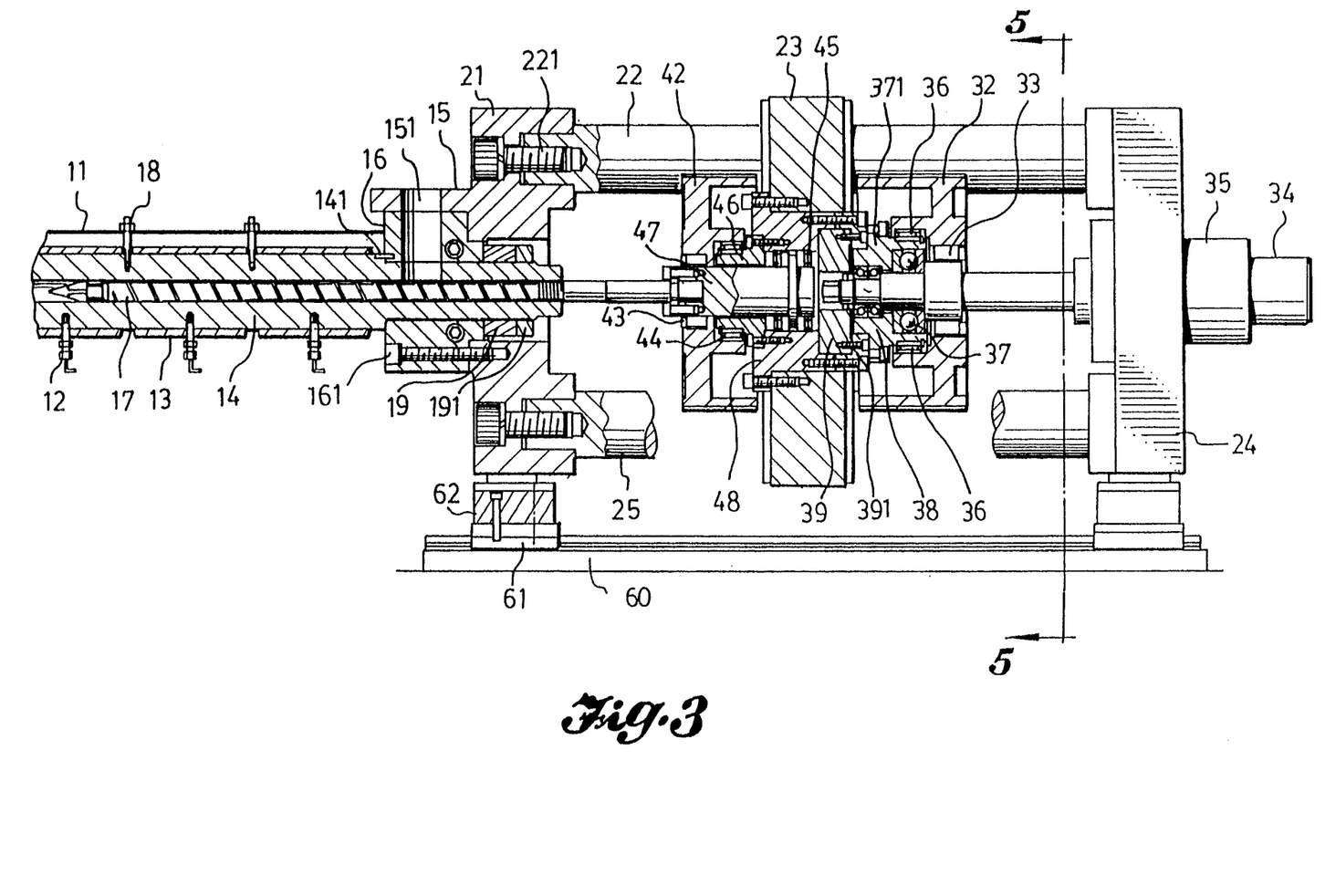
FIG. 3 is a partial sectional side view of the "screw-rotating/injection device of injection molding machine" according to an embodiment of the present invention.
Figure 4:
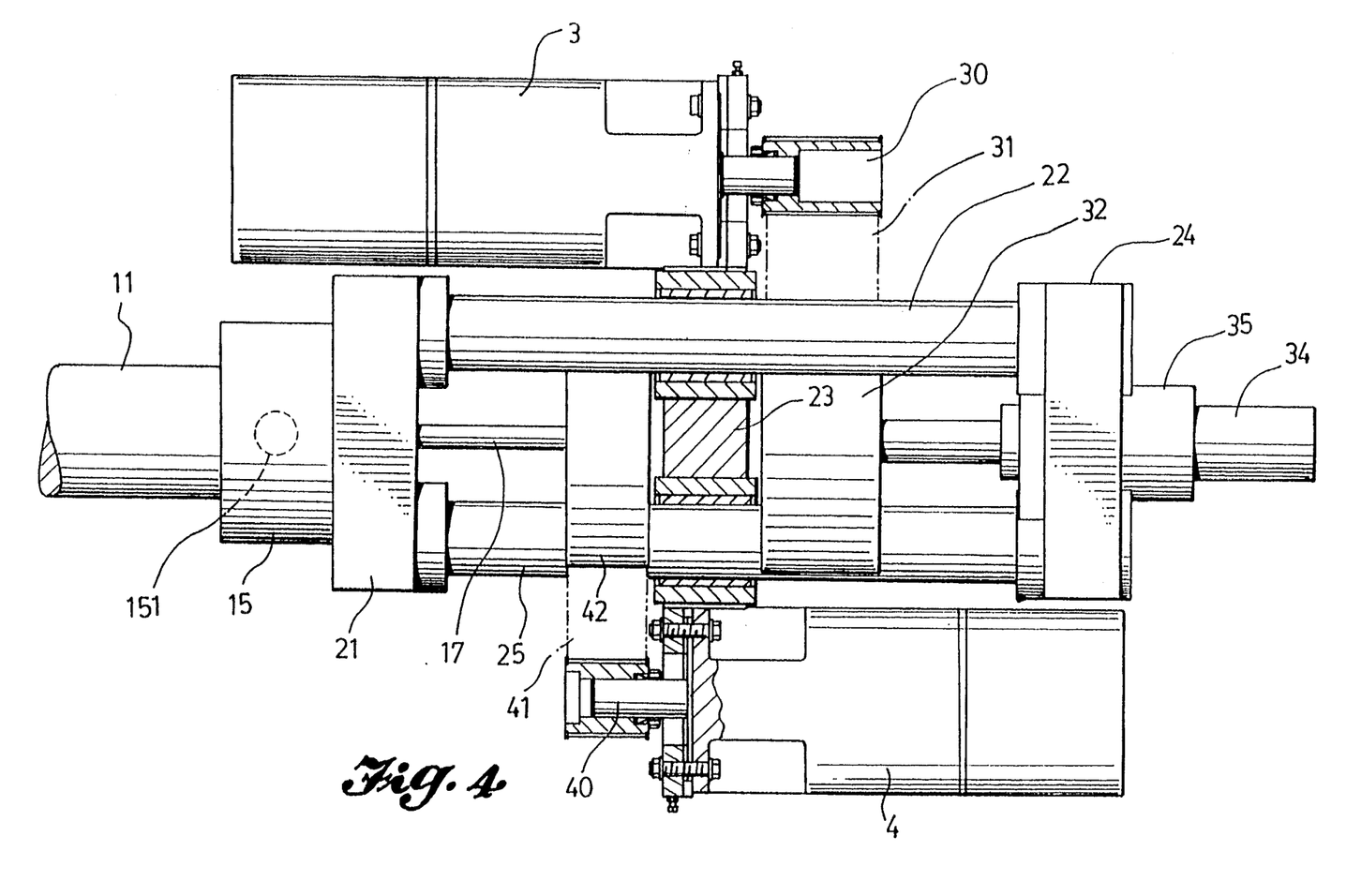
FIG. 4 is a top view of the "screw-rotating/injection device of injection molding machine" in accordance with an embodiment of the present invention.
Figure 5:
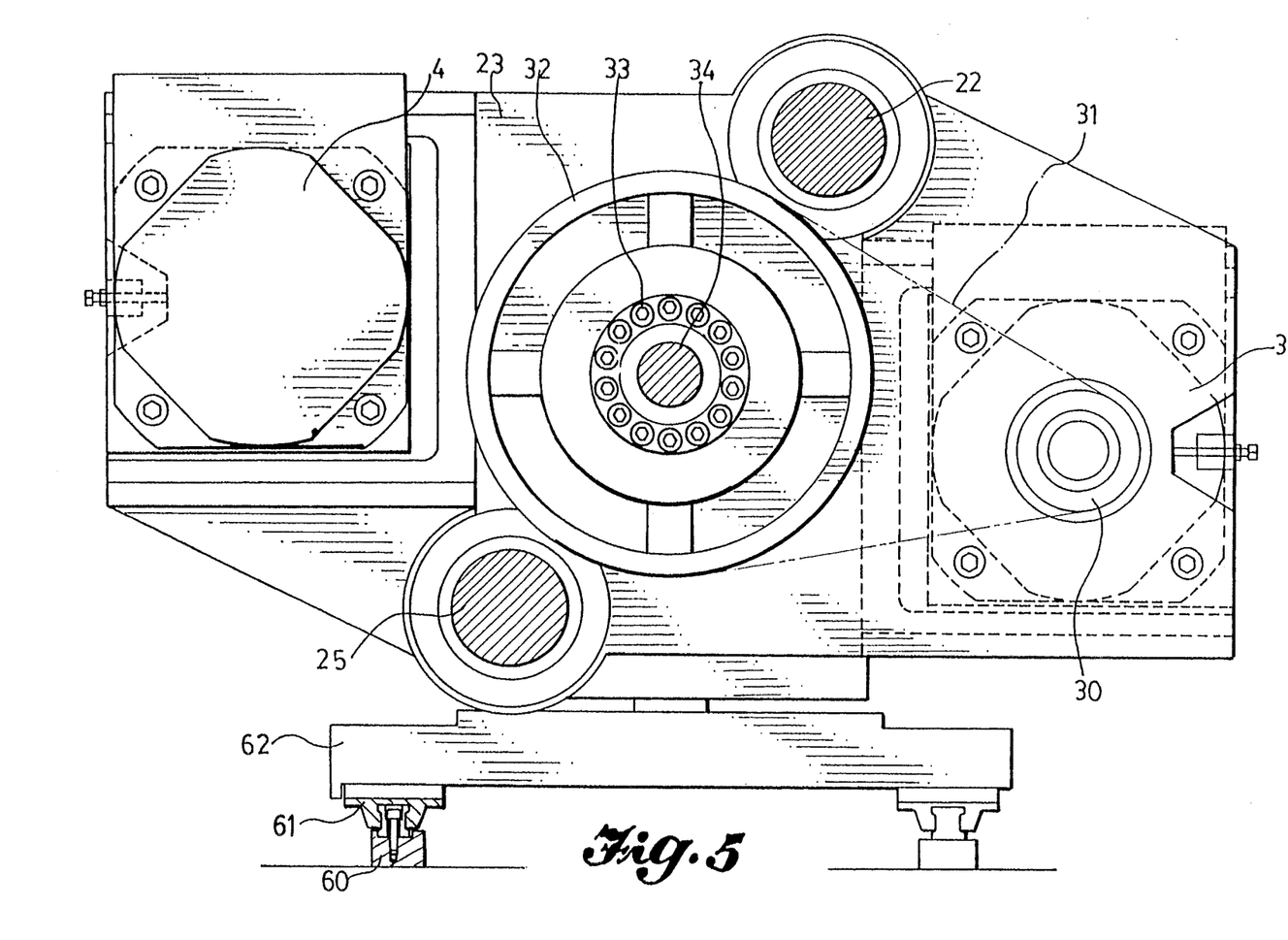
FIG. 5 is a fragmental sectional view taken along line 5—5 in FIG. 3.

Referring now to FIGS. 3 and 4 showing an embodiment of a screw-rotation/injection device of an injection molding machine in accordance with the present invention, it mainly comprises a front fixing plate (21), a rear fixing plate (24) and a movable pressure plate (23).

The front fixing plate (21) is formed with a through hole at the center thereof. The front and rear fixing plate (21, 24) are respectively supported by an injection seat (62). Two sliding rods (22, 25) are parallel to each other at a predetermined distance and extend between the front and rear fixing plates (21, 24). The sliding rod (22) is secured onto the front fixing plate (21) by a bolt (221). The movable pressure plate (23) is provided on two sliding rods (22, 25) between the front and rear fixing plates (21, 24) and is adapted to slide back and forth along two sliding rods (22, 25). The injection seat (62), in association with sliding seat (61) and sliding rails (60), can slidably move on the machine along the rails (60).

As shown in FIG. 4, an injection servomotor (3) is provided on one side of the movable pressure plate (23) and is adapted to drive a driving wheel (30). A ball screw (34) is pivotally mounted on the movable pressure plate (23) and is threadedly engaged with and passes through a ball nut (35) fixedly mounted at the center of the rear fixing plate (24). The ball screw (34) is pivotally connected with the movable pressure plate (23) by a thrust bearing (37) and an angular contact ball bearing (38) which are mounted on one end of the ball screw (34) by a locking nut (341) (see FIG. 6) and an elastic stop nut (342) (see FIG. 6) to bear against the axial and radial load of the ball screw (34). Through transmission elements such as a timing belt (31), a driven wheel (32) and a conical tightening ring (33), the ball screw (34) can be rotated by the driving wheel (30). In association with a ball nut (35) securely mounted on the rear fixing plate (24), the injection servomotor (3) can drive the movable pressure plate (23) to move back and forth along the two sliding rods (22, 25) to operate the injection, holding pressure, measuring back pressure of the injection machine.

Referring now to FIGS. 3 and 4, a screw shaft (17) including one front end and one rear end is provided within a heating cylinder (14). The screw shaft (17) passes through the through hole (not shown) of the front fixing plate (21) and pivotally engages with the movable pressure plate (23) by a connecting shaft (47). A measuring servomotor (4) is provided at the other side of the movable pressure plate (23) to rotate a driving wheel (40) provided at the free end of the output shaft thereof. Through the transmission of a timing belt (41), a driven wheel (42), a conical tightening ring (43) and a connecting shaft (47), the screw shaft (17) can be rotated by the measuring servomotor (4), so that the plastic material fallen from a hopper mounting seat (15) and a feeding opening (151) of a cooling column (16) be plasticized and transferred to the front end of a heating cylinder (14) to accomplish the measuring rotation of the screw shaft. A cooling column (16) is securely mounted on the front fixing plate (21) by bolts (161). The heating cylinder (14) is connected with the cooling column (16) by locating pins (141), nuts (19) and elastic stop nuts (191). The heating cylinder (14) is provided with heaters (13), thermal couples (12), cover bolts (18) and a cover (11). A thrust bearing (37) and an angular contact ball bearing (38) are provided at one end of the ball screw (34) and are assembled by a locking nut (341) and an elastic stop nut (342) (see FIG. 6), for bearing against the axial and radial load of the ball screw (34) when the movable pressure plate (23) moves. A needle bearing (36) is provided around outer periphery of a bearing housing (371) to bear against the radial force caused by the timing belt and the driven wheel (32). The bearing housing (371) is securely mounted on a compressing seat (391) by bolts. The compressing seat (391) is engaged with a connecting block (48) and a force sensor (39) by bolts.

Figure 8:
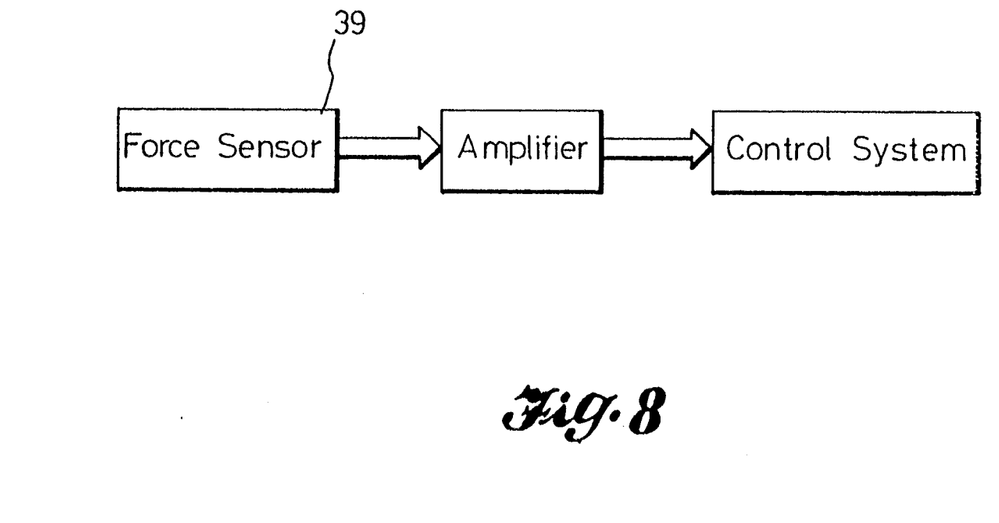
FIG. 8 is a schematic view showing the control logic relation among a force sensor, an amplifier and a control system, when the force sensor is used for sensing the variation of the pressure applying to the thrust bearing shown in FIG. 6.
Figure 9:
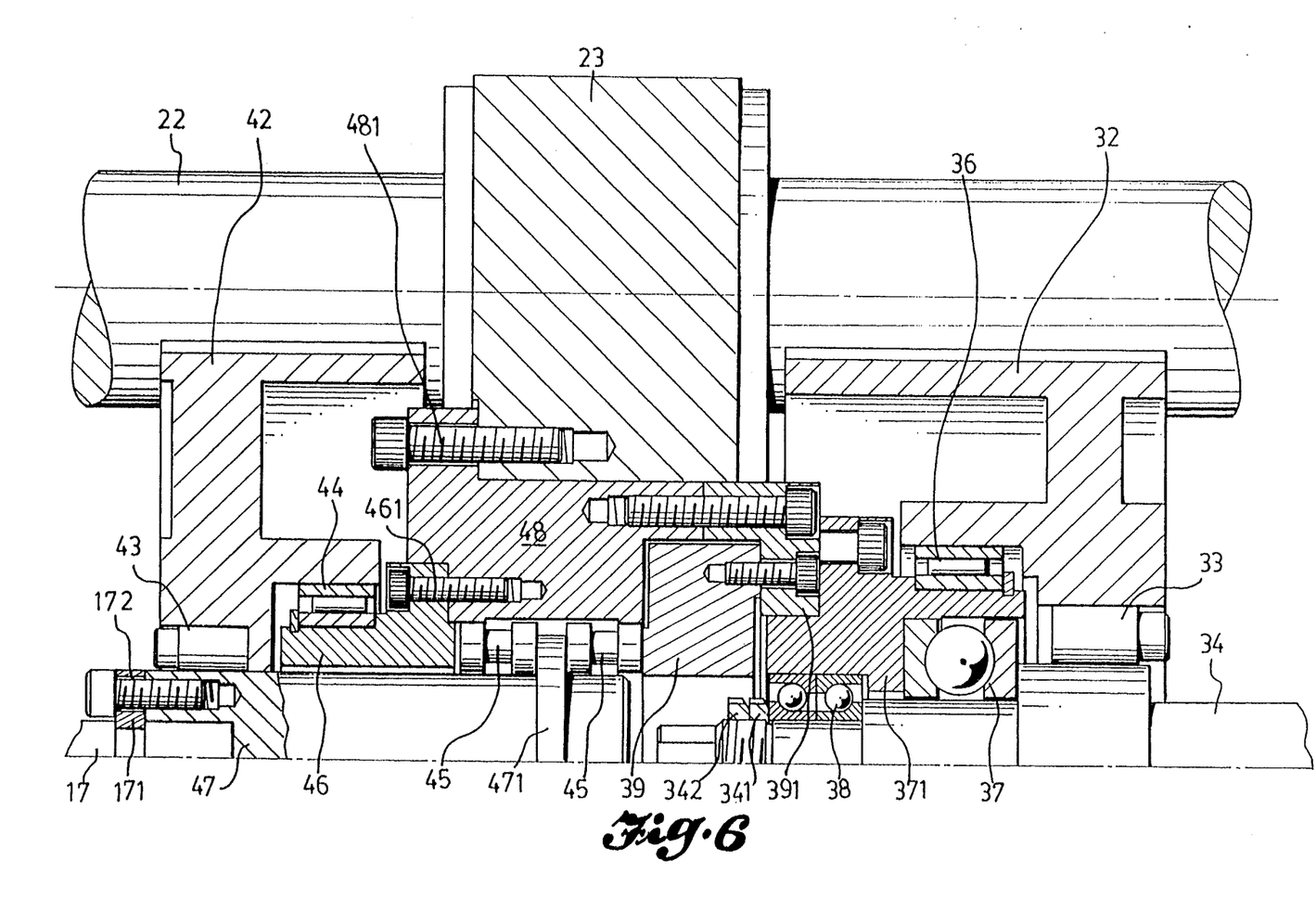

As shown in FIGS. 4, 6 and 8, the screw shaft (17) is connected with a connecting shaft (47) by a semiannular ring (171) and bolts (172). The connecting shaft (47) is formed with a protruding collar (471) nearby its free end, and is adapted to apply a predetermined pre-load to the thrust bearing (45), collar (471) and force sensor (39), through a bearing compressing plate (46). The bearing compressing plate (46) is fixedly mounted to the connecting block (48) by bolts (461). A needle bearing (44) provided at the outer periphery of the compressing plate (46) is adapted to bear against the radial force from the timing belt or driven wheel (42). The connecting block (48) is fixedly mounted to the movable pressure plate (23) by a plurality of bolts (481). When the injection, holding pressure and measuring back pressure operations are performed, the pressure of the molten molding material at the front end of the heating cylinder (14) will be transmitted to the force sensor (39) through the screw shaft (17), connecting shaft (47), collar (471) and thrust bearing (45). Then, the force sensor (39) will sense and send a corresponding voltage in response to the strain of the force sensor to an amplifier of a control system (see FIG. 8). The control system then corrects the output of the servomotor in accordance with error of the pressure, so as to correctly control the pressure of molten molding material at the front end of the heating cylinder (14), and so as to accomplish a close-loop control for the pressure of the molten molding material.

Figure 7:
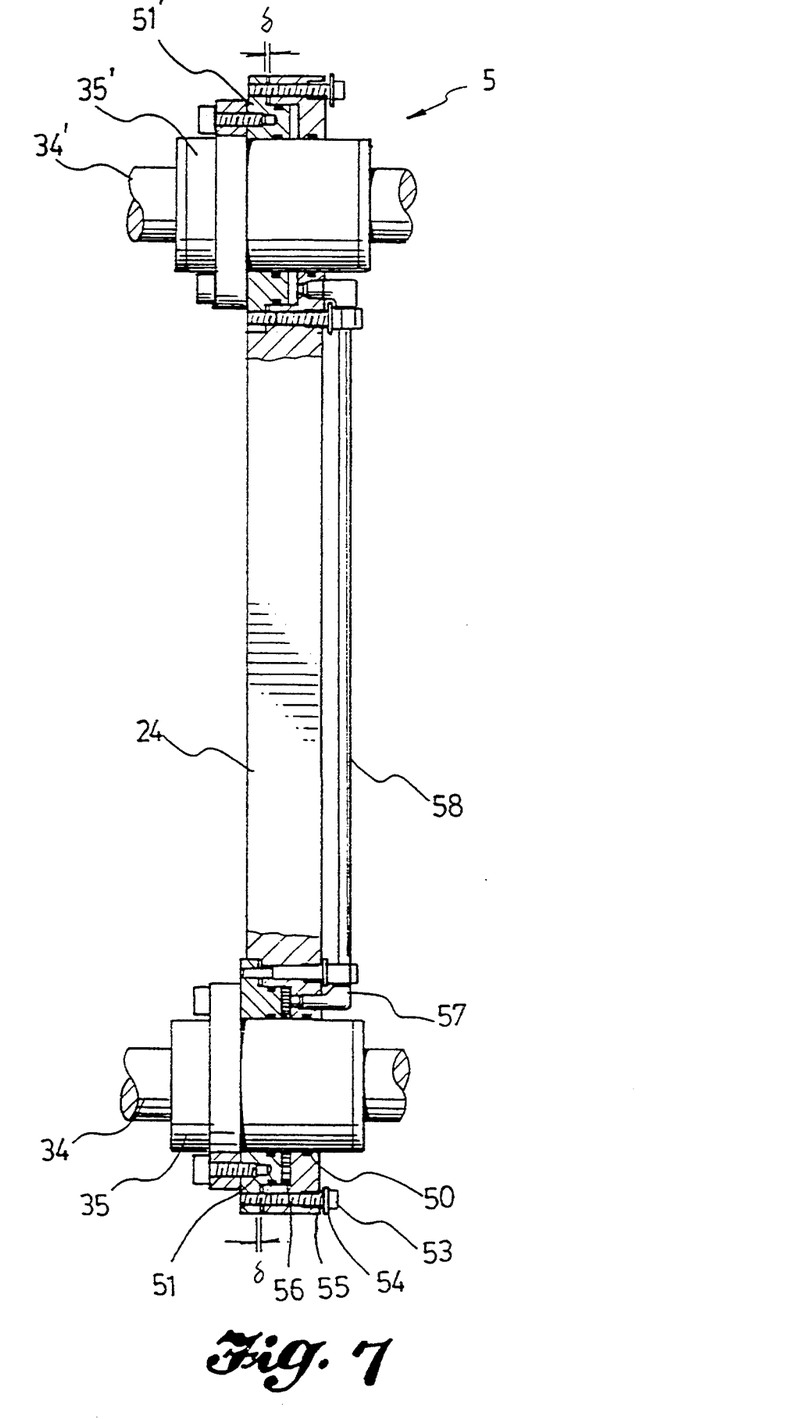
FIG. 7 is a schematically sectional side view showing the pre-loaded hydraulic system according to the present invention.

The present invention can also be used in a large injection molding machine. As a matter of fact, if a large injection molding machine uses only one ball screw, it is very possible that the ball screw cannot bear against the force of the injection and the holding pressure. Therefore, a large injection molding machine possibly need to use a plurality of ball screws. To avoid obliquity of the movable pressure plate (23) caused by unequal forces exerting on the ball screws due to the lead error between ball screws, the pitch error of the belt and pulley and the clearance of the belts, the present invention overcomes such a problem by using a pre-loaded hydraulic system having a communicating tube. In this way, each ball screw can be equally exerted force and synchronously moves. As shown in FIG. 7, the pre-loaded hydraulic system (5) comprises pistons (51, 51'), seals (50), hydraulic cylinders (56) formed within the rear fixing plate (24), high pressure-resistant liquid contained within the hydraulic cylinders (56) and a communicating tube (58). The pistons (51, 51') are arranged within the cylinders (56) and floatingly engage to the cylinders (56) with a pre-determined spaced gap ($\delta$) by compressing locking bolts (53), washer (54) and spring (55). The ball nuts (35, 35') are fixedly mounted on the pistons (51, 51'). The ball nuts (35, 35') are respectively threadedly engaged with ball screws (34, 34'). The communicating tube (58) connects between two cylinders (56) by tube joints (57), so that two cylinders (56) are in fluid communication with each other. When the ball screws (34, 34') are respectively rotated by a servomotor (not shown), the ball screws will have a displacement in axial direction relative to the ball nuts (35, 35'). If the axially advancing speed of the two ball screws (34, 34') are slightly different from each other, the gap ($\delta$) will allow one piston (51) or (51') to move toward the cylinder (56) to compress the fluid contained therein. When the fluid in one cylinder (56) is compressed, the communicating tube will balance the pressure between the two cylinders (56) and forwardly push the other piston (51') or (51). Therefore, when the ball screws (34, 34') are rotated and have a slight difference in advancing distance, the pre-loaded hydraulic system will keep the ball screws rotating and prevent the ball screws from impacting shock during injection.

In a large injection molding machine, the present invention may also use several electric motors to respectively drive several ball screws. The ball screw (34) can be directly rotated by a gear combination driven by an electric servomotor, to perform the operations of injection, holding pressure and measuring back pressure. Furthermore, the present invention may also apply electric motor(s) to directly drive a gear combination to rotate the screw shaft (17) to perform the measuring operation.

We claim:
1. A screw rotating and advancing device for an injection molding machine, said device comprising,
   a front fixing plate in which a through hole is formed at the center thereof;
   a rear fixing plate, parallel to said front fixing plate and including at least one ball nut securely mounted on said rear fixing plate;
   at least two sliding rods, parallel to each other and extending between said front and rear fixing plates;
   a movable pressure plate provided on said sliding rods between said front and rear fixing plates and adapted to slide along said sliding rods;
   a screw shaft having one front end and one rear end, in which said front end is formed with screw threads and said rear end thereof passes through said through hole at the center of said front fixing plate and pivotally connected to a first side of said movable pressure plate by a connecting shaft;
   at least one ball screw including one front end and one rear end in which the rear end is formed with threads and is adapted to pass through and threadedly engage with said ball nut of said rear fixing plate, and said front end of the ball screw is pivotally connected to a second opposite side of said movable pressure plate;
   at least one electric injection servomotor fixedly mounted on the first side of said movable pressure plate and is adapted to rotate said ball screw through a first transmission device;
   an electric measuring servomotor fixedly mounted on the second side of said movable pressure plate for rotating said screw shaft through a second transmission device;
   whereby the driving of the electric injection motor provided at the first side of the movable pressure plate rotates the ball screw relative to the ball nut provided on said rear fixing plate and drives the movable pressure plate for movement back and forth along said sliding rods to effectively reduce the space occupied by said ball screw, and whereby the measuring servomotor provided on the second side of said movable pressure plate and rotational speed of the screw shaft can be precisely controlled.

2. The screw rotating and advancing device for an injection molding machine in accordance with claim 1, wherein said front fixing plate and rear fixing plate respectively includes an injection seat to connect with said sliding seats so as to provide a sliding motion in association with sliding rails provided on the injection molding machine for adjusting the position of said screw rotating and advancing device.

3. The screw rotating and advancing device for an injection molding machine in accordance with claim 1, wherein said electric injection servomotor further comprises an output shaft having a free end attached with a driving wheel, and the ball screw further comprises a driven wheel adapted to be driven by said driving wheel provided at the free end of the output shaft of the electric injection servomotor.

4. The screw rotating/and advancing device for an injection molding machine in accordance with claim 1, wherein said first transmission device includes a timing belt and a conical tightening ring.

5. The screw rotating and advancing device for an injection molding machine in accordance with claim 1, wherein said second transmission device includes a timing belt and a conical tightening ring; said measuring servomotor further comprises an output shaft having a free end attached with a driving wheel; said connecting shaft connecting at one end of the screw shaft further comprises a driven wheel adapted to be rotated by said driving wheel of the measuring servomotor through the second transmission device.

6. The screw rotating and advancing device for an injection molding machine in accordance with claim 1, wherein said connecting shaft connecting to the rear end of the screw shaft further comprises a protruding collar nearby a free end thereof, said collar being arranged between two thrust bearings.

7. The screw rotating/and advancing device for an injection molding machine in accordance with claim 5, wherein said movable pressure plate further comprises a force sensor and a bearing compressing plate, said bearing compressing plate envelops the outer periphery of the connecting shaft and is fixedly mounted to said movable pressure plate by bolts to compress the thrust bearings inwardly; said force sensor is provided within said movable pressure plate to bear against the pressure from said thrust bearing.

8. The screw rotating/and advancing device for an injection molding machine in accordance with claim 7, wherein said force sensor is adapted to sense a variation of the pressure applying to said thrust bearing from said collar of said connecting shaft, and sends a voltage in response to a strain caused by the variation of pressure to a control system through an amplifier, so that said control system corrects an output power of the servomotors in response to pressure error, so as to correctly control the pressure of molten material and so as to accomplish a close loop control of the pressure of the molten material.

9. The screw rotating/and advancing device for an injection molding machine in accordance with claim 1, wherein the number of the ball screws is two, which are parallel to each other and pivotally mounted on said moveable pressure plate and respectively passes through said ball nut provided at said rear fixing plate, and are rotated by the driving of said injection servomotor.

10. The screw rotating/and advancing device for an injection molding machine in accordance with claim 8, wherein said rear fixing plate further comprises a preloaded hydraulic system, said hydraulic system comprises two hydraulic cylinders, two pistons and a communicating tube in fluid communication between said two cylinders; said hydraulic cylinders are formed within said rear fixing plate, and said pistons are respectively provided on one said ball nut; said pistons are floatingly and co-axially provided within said cylinder with a predetermined spaced gap therebetween, whereby the fluid communication of said communicating tube between the two cylinders, the pressure respectively in said cylinders can be balanced.

* * * * *